(12) United States Patent
Jin

(10) Patent No.: US 7,577,072 B2
(45) Date of Patent: Aug. 18, 2009

(54) METHOD AND APPARATUS OF IDENTIFYING DISC TYPES

(75) Inventor: Cheol Jin, Sungnam-si (KR)

(73) Assignee: Hitachi-LG Data Storage Korea, Inc., Seoul (KR)

( * ) Notice: Subject to any disclaimer, the term of this patent is extended or adjusted under 35 U.S.C. 154(b) by 659 days.

(21) Appl. No.: 11/227,482

(22) Filed: Sep. 16, 2005

(65) Prior Publication Data
US 2006/0067191 A1 Mar. 30, 2006

(30) Foreign Application Priority Data
Sep. 17, 2004 (KR) .................. 10-2004-0074406

(51) Int. Cl.
*G11B 7/00* (2006.01)
(52) U.S. Cl. .................. 369/53.2; 369/47.1; 369/53.23
(58) Field of Classification Search .................. None
See application file for complete search history.

(56) References Cited

U.S. PATENT DOCUMENTS

| 5,764,610 | A | 6/1998 | Yoshida et al. .................. 369/58 |
| 6,490,237 | B1 | 12/2002 | Supino .................. 369/59.1 |
| 2002/0101802 | A1 | 8/2002 | Ogasawara et al. ...... 369/44.37 |
| 2003/0161231 | A1 | 8/2003 | Ueki .................. 369/44.29 |
| 2004/0090883 | A1 | 5/2004 | Lee et al. .................. 369/44.29 |
| 2004/0090894 | A1 | 5/2004 | Kim et al. .................. 369/53.22 |
| 2004/0130986 | A1 | 7/2004 | Minase et al. .................. 369/47.39 |
| 2004/0136296 | A1 | 7/2004 | Hsu et al. .................. 369/53.23 |
| 2004/0151099 | A1 | 8/2004 | Hsu et al. .................. 369/53.23 |
| 2005/0174907 | A1 | 8/2005 | Huang .................. 369/53.2 |
| 2005/0276199 | A1 | 12/2005 | Sugai .................. 369/53.22 |

FOREIGN PATENT DOCUMENTS

| JP | 2000322742 A | * | 11/2000 |
| JP | 2002100041 A | * | 4/2002 |
| JP | 2004246990 A | * | 9/2004 |

OTHER PUBLICATIONS

European Search Report dated Oct. 1, 2007.
European Search Report dated Apr. 25, 2008.

* cited by examiner

*Primary Examiner*—Jorge L Ortiz Criado
(74) *Attorney, Agent, or Firm*—Ked & Associates, LLP

(57) ABSTRACT

Embodiments of a method and apparatus of identifying optical disk types according to the present invention can identify the type of an optical disk (e.g., DVD-RAM, DVD-RAM, or DVD+/−RW) based on comparisons between a plurality of signals. For example, comparisons between the magnitudes of DPD and DPP tracking error signals and their respective reference values can be used. If an optical disk is identified as DVD+RW or DVD−RW, embodiments according to the present invention can further determine whether the optical disk is DVD+RW or DVD−RW. For example, the frequency of a wobble signal resulting from the shape of tracks formed on the optical disk and variables that affect the wobble frequency (e.g., the rotational speed of the optical disk and the current track position) can be used.

14 Claims, 8 Drawing Sheets

|  | DVD-ROM | DVD+/-RW | DVD-RAM |
|---|---|---|---|
| DPD Signal | Big | Medium Big | Big |
| DPP Signal | Small | Medium | Big |

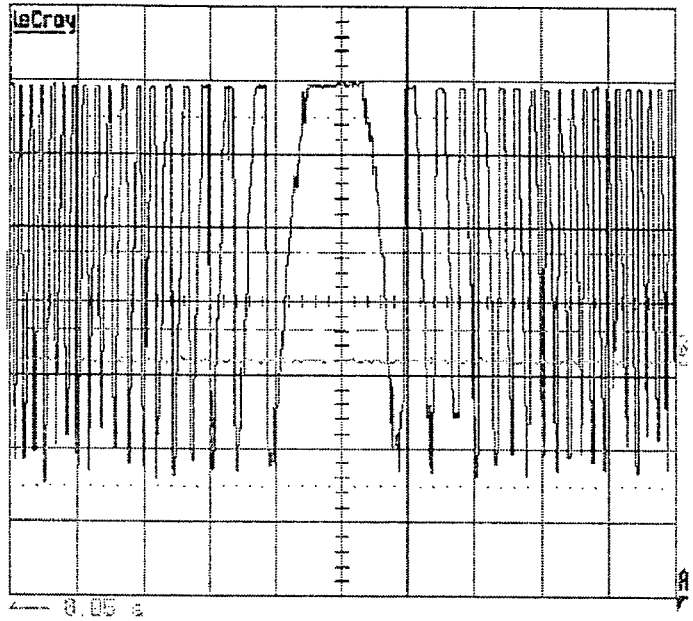
FIG. 2a DVD-ROM
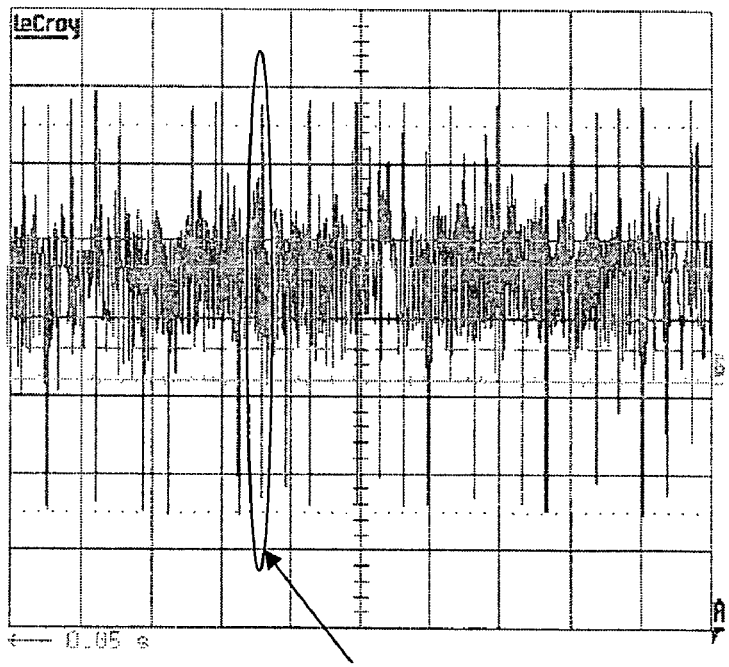
FIG. 2b DVD-RAM

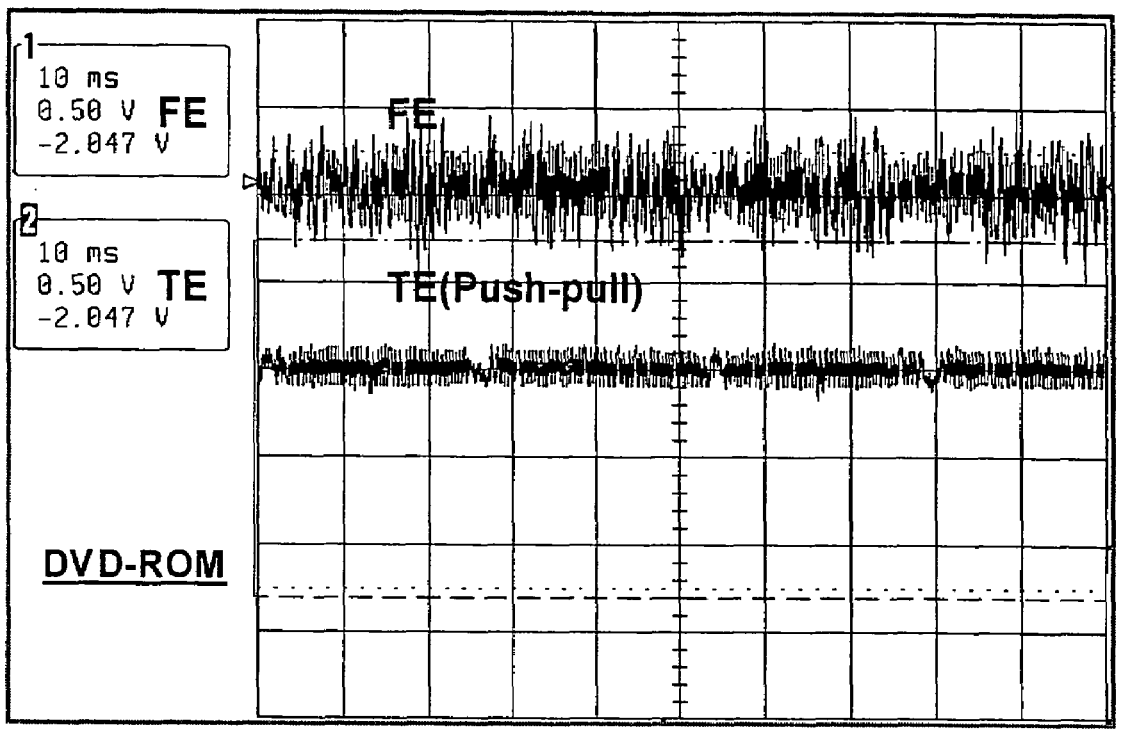

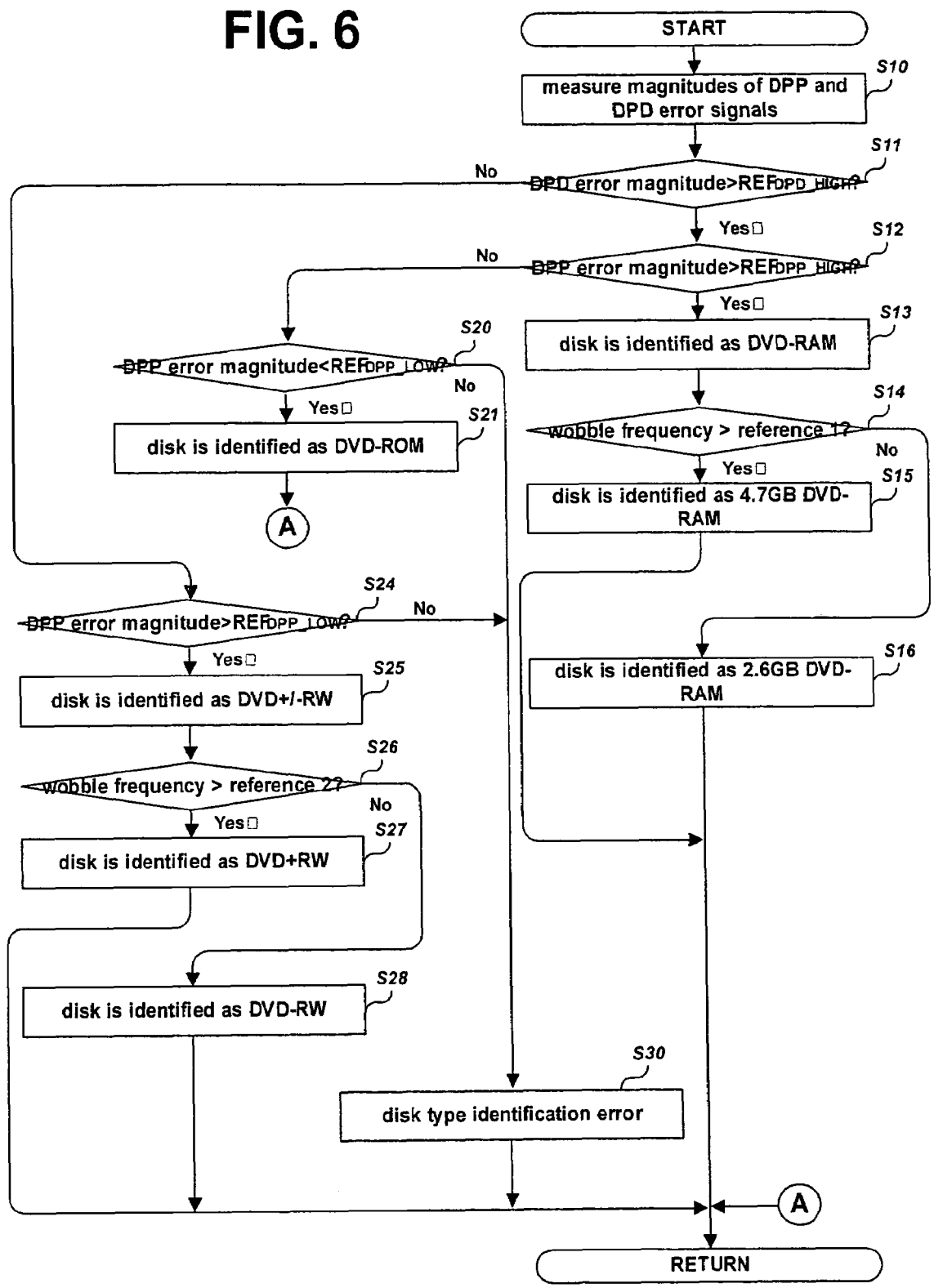

*in memory*

| DPD References | REF$_{DPD\_HIGH}$ |
| --- | --- |
| | REF$_{DPD\_LOW}$ |
| DPP References | REF$_{DPP\_HIGH}$ |
| | REF$_{DPP\_LOW}$ |

METHOD AND APPARATUS OF IDENTIFYING DISC TYPES

BACKGROUND OF THE INVENTION

1. Field of the Invention

The present invention relates to a method and apparatus of identifying disk types.

2. Background of the Related Art

Optical disks capable of recording large amounts of high-quality digital video/audio data have been widely used in various fields. The types of optical disks include read-only type, one-time recordable type, and rewritable type.

DVD-ROM (digital versatile disc read only memory) is a representative example of read-only optical disks and DVD-R is an example of one-time recordable optical disks. Rewritable optical disks include DVD-RW, DVD-RAM, and DVD+RW.

The DVD has storage capacity ranging from 2.6 Gbytes to 4.7 Gbytes per side. The storage capacity of a DVD disk can be increased by placing two recording layers on one side and recording different data on each layer. Data recorded on one layer of a dual-layer DVD can be retrieved by focusing the laser beam only on that layer.

The optical characteristics of an optical disk change depending on the disk type, which means that the servo system of an optical disk recording/reproducing apparatus should adjust its servo parameters to the disk type. Therefore, if an optical disk is inserted for recording data or playing back data, the first thing that the optical disk recording/reproducing apparatus should do is to identify the optical disk type.

The above references are incorporated by reference herein where appropriate for appropriate teachings of additional or alternative details, features and/or technical background.

SUMMARY OF THE INVENTION

An object of the invention is to solve at least the above problems and/or disadvantages or to provide at least the advantages described hereinafter.

Another object of the present invention is to provide a method and apparatus for identifying optical disk types.

Another object of the present invention is to provide a method and apparatus for identifying optical disk types based on comparisons between the magnitudes of a first and a second tracking error signals and their respective reference values.

Another object of the present invention is to provide a method and apparatus for identifying optical disk types by detecting the frequency of a wobble signal resulting from the shape of tracks formed on an optical disk and variables that affect the wobble frequency.

Another object of the present invention is to provide a method and apparatus for identifying optical disk types of various DVDs.

In order to achieve at least the above objects or advantages in a whole or in part, and in accordance with the purpose of the invention as embodied and broadly described herein, there is provided a method of identifying a plurality of storage medium types that includes creating a first signal and a second signal from light reflected from a storage medium and identifying the type of the optical disk based on comparisons between the two signals and a respective reference value.

To further achieve at least the above object or advantages in a whole or in part and in accordance with the purpose of the invention as embodied and broadly described herein, there is provided an apparatus for identifying a type of optical disk that includes a processing unit configured to convert a reflected beam from a loaded optical disk into electrical signals, and generate a first signal and a second signal therefrom and a controller configured to identify the type of the loaded optical disk based on comparisons between the level of the generated signals and a respective reference value.

To further achieve at least the above object or advantages in a whole or in part and in accordance with the purpose of the invention as embodied and broadly described herein, there is provided a method of identifying storage medium types that includes detecting a frequency of a wobble signal resulting from the shape of tracks formed on a storage medium, identifying the type of the storage medium based on the detected wobble frequency, rotational speed and position.

To further achieve at least the above object or advantages in a whole or in part and in accordance with the purpose of the invention as embodied and broadly described herein, there is provided an apparatus of recording data on an optical disk or playing back data from an optical disk that includes a read-out circuit configured to irradiate a laser beam onto an optical disk, and convert a reflected laser beam from the optical disk into electrical signals, a detector configured to detect a frequency of a wobble signal resulting from the shape of tracks formed on the optical disk and variables that affect the wobble frequency, a servo unit configured to servo control of the read-out circuit and a controller configured to identify the type of the optical disk based on the detected wobble frequency.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIGS. 2a through 2c illustrate exemplary DPD tracking error signals detected from three different disk types;

FIGS. 4a through 4c illustrate exemplary DPP tracking error signals detected from three different disk types;

FIG. 5 illustrates exemplary levels of DPD and DPP tracking error signals detected from three optical disk types;

FIG. 6 illustrates a flowchart of a method of identifying disk types in accordance with an embodiment of the present invention;

DETAILED DESCRIPTION OF PREFERRED EMBODIMENTS

Figure 1:
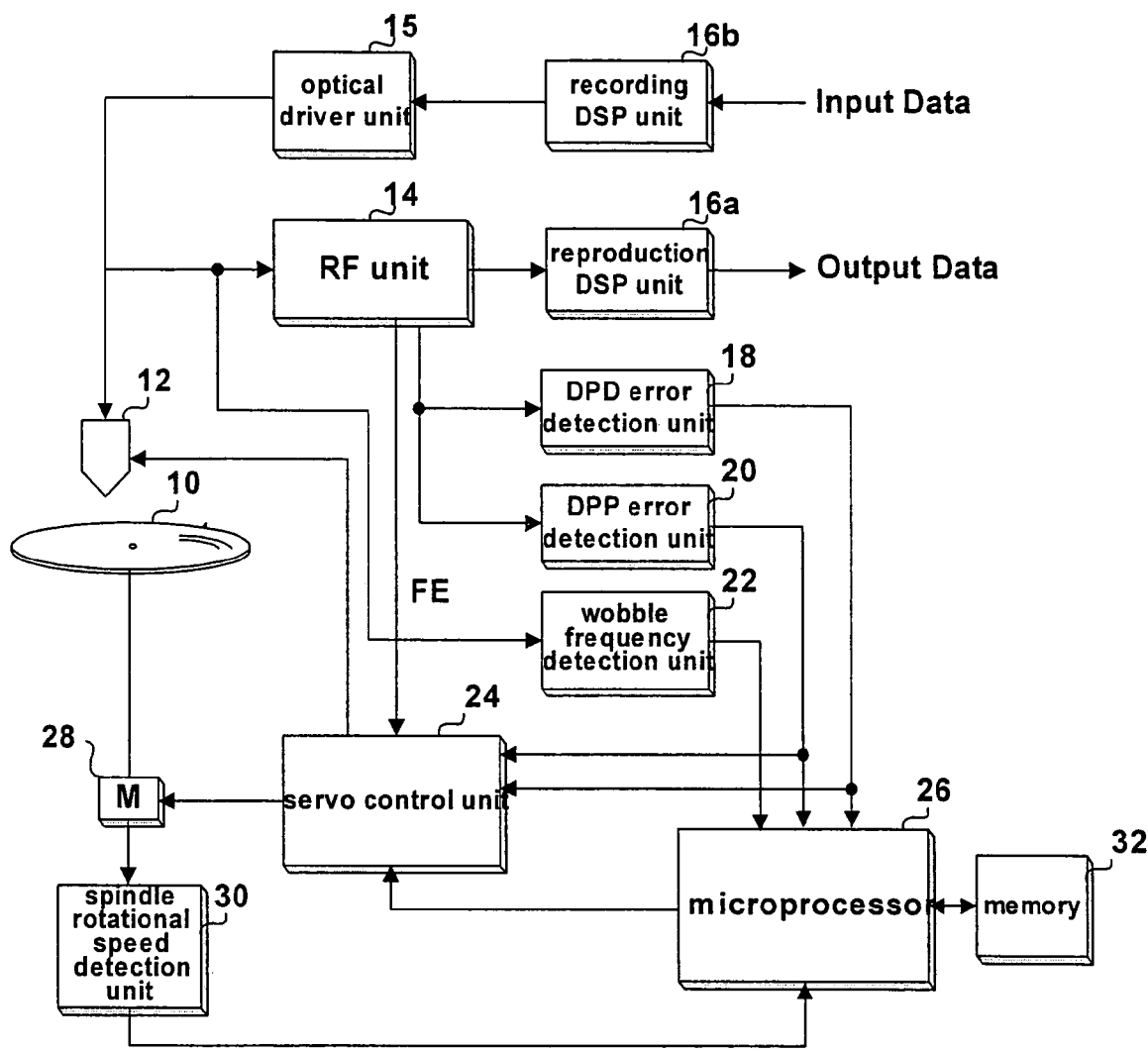
FIG. 1 illustrates a block diagram of an embodiment of an optical disk recording/playback apparatus embodying the present invention.

FIG. 1 illustrates a block diagram of an embodiment of an optical disk recording/reproducing apparatus embodying the present invention. As shown in FIG. 1, the optical disk recording/reproducing apparatus can include an optical pickup 12 for recording data on an optical disk 10 or reproducing recorded data from the optical disk 10, an RF unit 14 for generating a binary signal conveying data and electrical signals for creating focus/tracking error signals from the output of the optical pickup 12, a reproduction DSP unit 16a for retrieving digital data from the binary signal, a servo control unit 24 for controlling the optical pickup 12 and a spindle motor 28 for rotating the optical disk 10 using the focus error signal and the tracking error signal from either a DPD error detection unit 18 or a DPP error detection unit 20, a rotational speed detection unit 30 for detecting the rotational speed of the spindle motor 28, the DPD error detection unit 18 for generating a DPD tracking error signal(s) from the electrical signals provided by the optical pickup 12, the DPP error detection unit 20 for generating a DPP tracking error signal(s) from the electrical signals provided by the optical pickup 12, a wobble frequency detection unit 22 for detecting the frequency of a wobble signal from the output of the optical pickup 12, a recording DSP unit 16b for converting data to be recorded into the ECC format and modulating the ECC format data for recording, an optical driver unit 15 for providing electric currents to the optical pickup 12 according to the recording signal from the recording DSP unit 16b, a memory 32 for storing data, and a microprocessor 26 for supervising overall operations of the apparatus.

The DPD error detection unit 18 can create a DPD tracking error signal by comparing sum of two electrical signals from two diagonally-positioned photo diodes (a+c) with sum of two electrical signals from the other two diagonally-positioned photo diodes (b+d) in phase, the four diodes forming an exemplary photo detector unit contained in the RF unit 14. The DVD-RAM has pre-pits in header areas formed intermittently along the track and the DVD-ROM has pre-pits as data recorded thereon. The edges of pre-pits are clearer than those of marks in DVD+/−RW because marks are obtained by changing the property of the disk material. As a result, DVD-RAM and DVD-ROM disks yield relatively larger DPD tracking error signals than DVD+/−RW, which is exemplified by the exemplary DPD tracking error signals shown in FIGS. 2a through 2c.

Figure 2C:
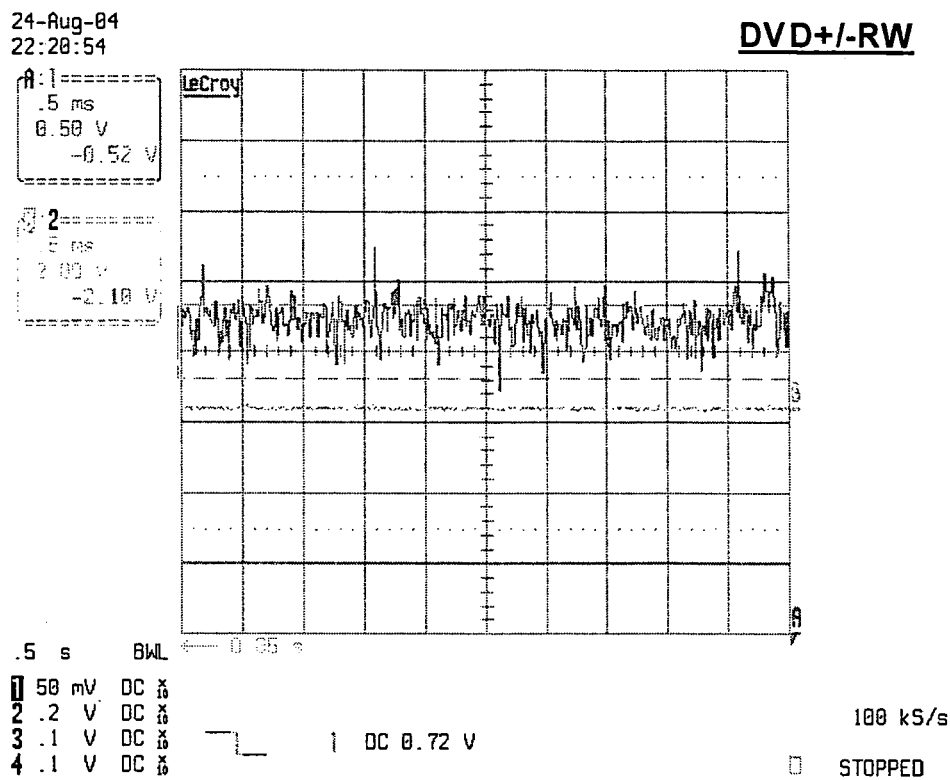

The tracking error signal of the DVD-ROM disk shown in FIG. 2a has evenly, large magnitude across all tracks. The tracking error signal of the DVD-RAM disk shown in FIG. 2b has a large magnitude only at headers (e.g., marked S in FIG. 2b). The tracking error signal of the DVD+/−RW disk shown in FIG. 2c has a small magnitude across all tracks. The DVD+/−RW disk yields very small DVD tracking signals particularly when no data is recorded thereon.

The DPP error detection unit 20 can create a DPP tracking error signal by subtracting sum of two sub push-pull signals (e.g., SPPe=(e+f)−(g+h)) from main push-pull signal (e.g., MPPe=(a+d)−(b+c)) with proper amplification of the sum signal, e.g., the DPP tracking error is expressed as MPPe−k*SPPe. The magnitude of the DPP tracking error signal can differ depending on the disk type because different pit depth or groove depth results in different diffraction interference of incident and reflected beams.

Figure 3:
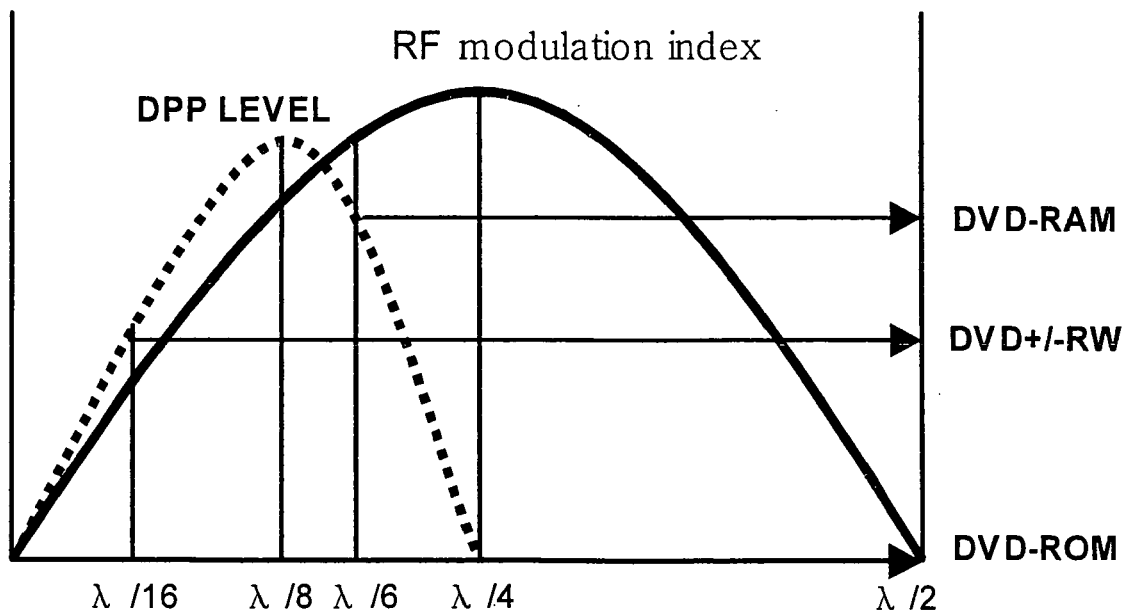
FIG. 3 illustrates an exemplary relation between the level of DPP tracking error signal and pit depth or groove depth.

FIG. 3 illustrates exemplary DPP error signal levels and RF modulation index versus pit or groove depth for three DVD disk types. The pit depth of the DVD-ROM is $\lambda/4$ and the grove depth is $\lambda/6$ for the DVD-RAM and $\lambda/16$ for the DVD+/−RW.

According to the graph shown in FIG. 3, the DVD-RAM yields the largest magnitude and the DVD-ROM yields the smallest magnitude with respect to the DPP tracking error.

Figure 4A:
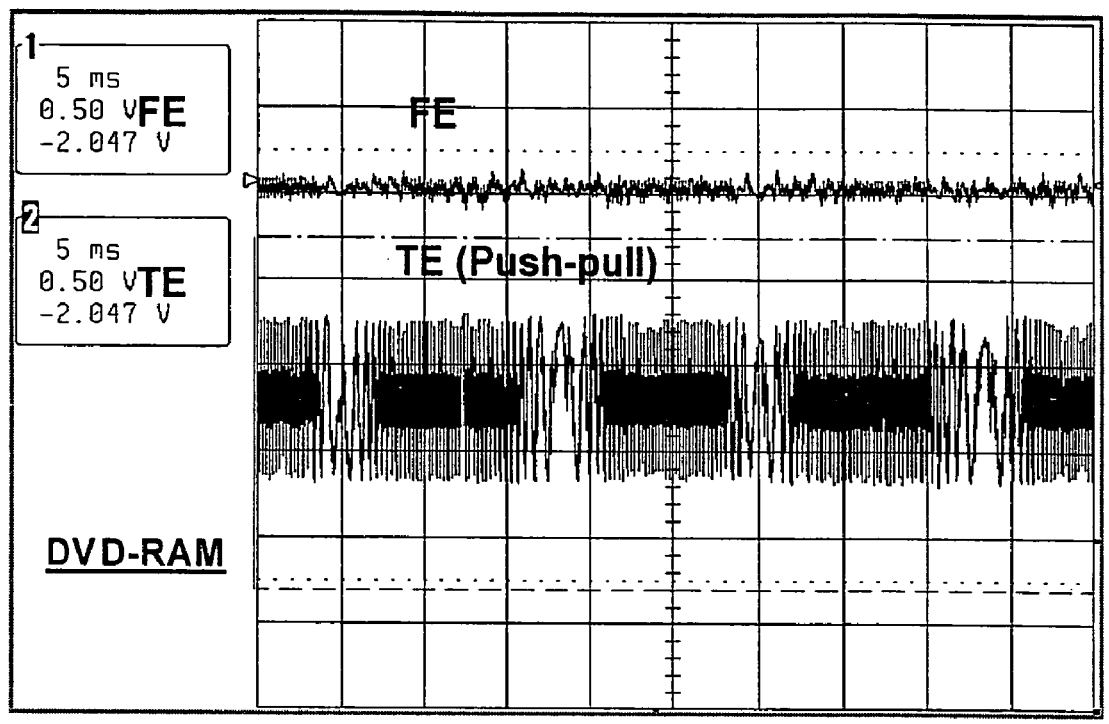
Figure 4B:
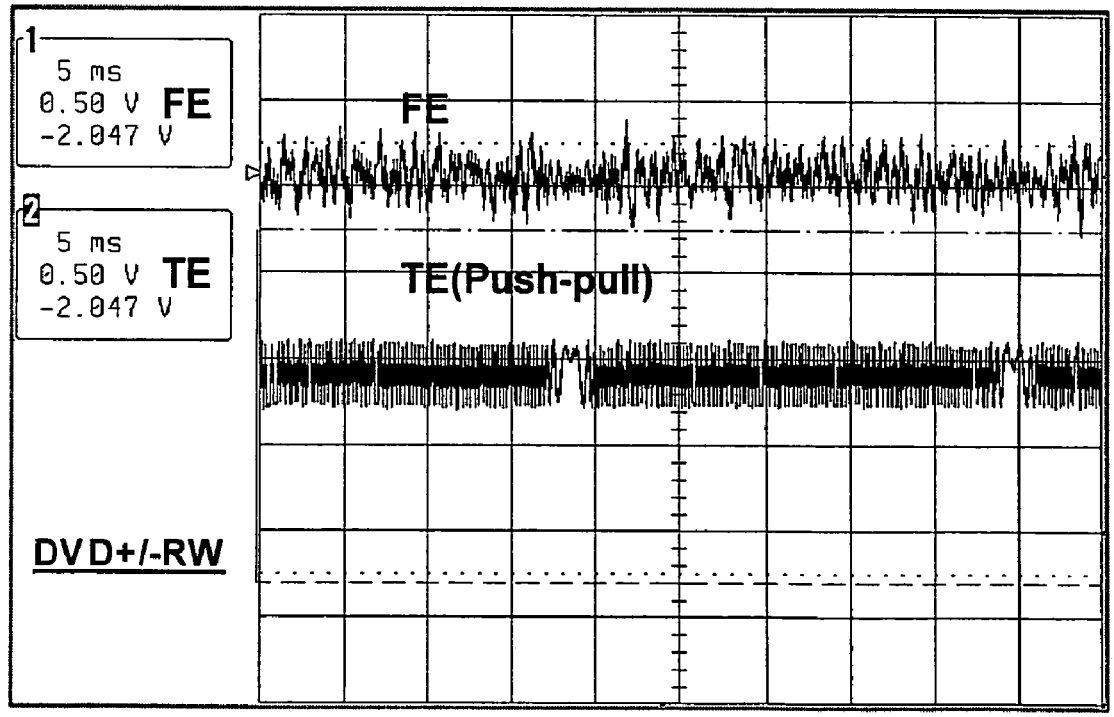

FIGS. 4a through 4c illustrate exemplary DPP tracking error signals detected from DVD-RAM, DVD+/−RW, and DVD-ROM where one vertical division corresponds to 0.5 volts in all the graphs.

FIG. 5 illustrates exemplary determinable magnitudes of tracking error signals created by the DPD error detection unit 18 and DPP error detection unit 20, which can be used according to embodiments of the present invention.

FIG. 6 shows a flowchart of a method of identifying disk types in accordance with one embodiment of the present invention. As shown in FIG. 6, the method can be applied to and will be described using the apparatus of FIG. 4. However, the present invention is not intended to be so limited.

Figures 7A, 7B:
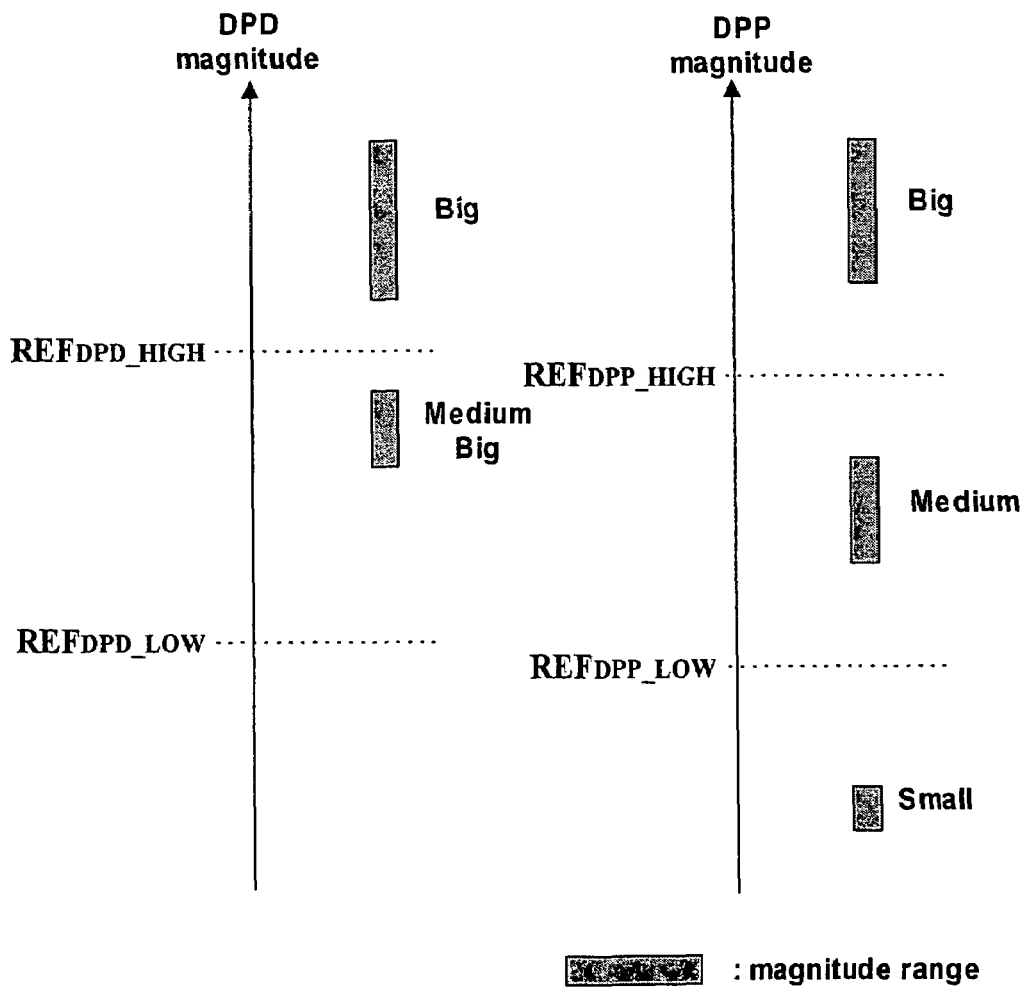
FIGS. 7a and 7b illustrate exemplary reference values used for identifying disk types stored in memory and the relation between the levels of the reference values and tracking error signals.

As shown in FIG. 7a, reference values '$REF_{DPD\_HIGH}$', '$REF_{DPD\_LOW}$', '$REF_{DPP\_HIGH}$', and '$REF_{DPP\_LOW}$' can be stored in the memory 32. If the magnitude of the DPD error signal is less than '$REF_{DPD\_LOW}$', the DPD error signal is considered to be small and if the magnitude of the DPD error signal exceeds '$REF_{DPD\_HIGH}$', the DPD error signal is considered to be big. Similarly, if the magnitude of the DPP error signal is less than '$REF_{DPP\_LOW}$', the DPP error signal is considered to be small and if the magnitude of the DPP error signal exceeds '$REF_{DPP\_HIGH}$', the DPP error signal is considered big. For example, the reference values can be determined based on the magnitudes of tracking error signals obtained by experiments as shown in FIG. 7b.

If the optical disk 10 is loaded, the microprocessor 26 can command the servo control unit 24 to rotate the optical disk 10 with a predefined initial speed by driving the spindle motor 28 and to activate focusing control. The microprocessor 26, for example, can then execute the routine shown in FIG. 6 for identifying the disk type.

The microprocessor 26 can measure the magnitudes of the tracking error signals from the DPD error detection unit 18 and the DPP error detection unit 20 (block S10) and compare the DPD error signal magnitude to the reference value '$REF_{DPD\_HIGH}$' (block S11). If the magnitude exceeds '$REF_{DPD\_HIGH}$', the microprocessor 26 can compare the magnitude of the DPP error signal to the reference value '$REF_{DPP\_HIGH}$' (block S12). If the magnitude also exceeds '$REF_{DPP\_HIGH}$', the microprocessor 26 can identify the optical disk 10 as DVD-RAM (block S13) and examine the storage capacity thereof.

The disk capacity can be determined based on the frequency of wobble signal provided by the wobble frequency detection unit 22, the disk rotational speed provided by rotational speed detection unit 30, and the current (e.g., radial) position of the optical pickup 12. If the wobble frequency exceeds a corresponding reference value for judging DVD-RAM capacity at the position with the measured rotational speed (block S14), the disk capacity can be concluded to be 4.7 Gbytes (block S15). Otherwise, the disk capacity can be concluded to be 2.6 Gbytes (block S16), which can finish the routine for identifying the disk type.

Because wobble frequency measured at a position is proportional to the product of the radius (e.g., the radial distance between the position and disk center) and rotational speed, the microprocessor 26 may calculate the reference value for judging disk capacity using an equation expressed in terms of the measured position and speed or may select one appropriate value from a lookup table containing many values calculated for various positions and rotational speeds stored in the memory 32. For example, the reference values can be determined based on wobble signals obtained by experiment.

The position of the optical pickup 12 can be measured by keeping track of kick operations from the initial position, which is the innermost track. The identification of disk types is usually performed at the innermost track, in which case the position at which the rotational speed is measured is the innermost track. However, the present invention is not intended to be so limited.

If the magnitude of the DPP error signal is determined to be less than 'REF$_{DPP\_HIGH}$' at (block S12), the microprocessor 26 can compare the magnitude to 'REF$_{DPP\_LOW}$' (block S20). If the magnitude is less than 'REF$_{DPP\_LOW}$', the microprocessor 26 can identify the optical disk 10 as DVD-ROM (block S21); and otherwise can consider the situation as a disk type identification error (block S30).

If the magnitude of the DPD error signal is determined to be less than 'REF$_{DPD\_HIGH}$' at (block S11), the microprocessor 26 can compare the magnitude of the DPP tracking error signal to 'REF$_{DPP\_LOW}$' (block S24). If the magnitude is greater than 'REF$_{DPP\_LOW}$', the microprocessor 26 can conclude the optical disk 10 to be DVD+RW or DVD−RW (block S25) and read the disk rotational speed and wobble frequency to determine whether the disk 10 is DVD+RW or DVD−RW. The wobble frequency can be compared to a reference value (e.g., a second reference value) for judging RW type (block S26). If the wobble frequency is greater than the reference value, the optical disk 10 can be concluded to be DVD+RW (block S27). Otherwise, the optical disk 10 can be concluded to be DVD−RW (block S28). Like the reference value for judging DVD-RAM capacity, the reference value for judging RW type may be calculated using a programmed equation or may be chosen from a lookup table, for example, stored in the memory 32.

If the magnitude of the DPP error signal is determined to be less than 'REF$_{DPP\_LOW}$' at (block S24), the microprocessor 26 can regard the situation as a disk type identification error (block S30). When an identification error occurs, the microprocessor 26 may repeat the identification routine shown in FIG. 6 or notify a host computer or a user of the identification error. However, the present invention is not intended to be so limited.

The microprocessor 26 may further examine whether the disk is blank if the disk is identified as DVD+RW or DVD−RW. The magnitude of DPD tracking error signal generated by a DVD+RW or DVD−RW disk with data recorded thereon is greater than that generated by a blank disk, and therefore, a reference value for judging blank disks can be determined. The magnitude of the DPD error signal can be used for determining whether a DVD+RW or DVD−RW disk is blank.

Alternatively, if a rewritable DVD disk has data recorded thereon, the reflectance of the disk becomes lower because marks exist along the track, which decreases the magnitude of the DPP tracking error signal. Therefore, a reference value for judging blank disks can be determined in consideration of this property, and the magnitude of the DPP error signal can be used for determining whether a DVD+RW or DVD−RW disk is blank.

If the optical disk 10 is determined to be blank, the microprocessor 26 can immediately notify the host computer of the status. From blocks S21, S27, S28 and S30, the routine for identifying disk type can be concluded to be completed.

In the embodiment shown in FIG. 6 of the present invention, two reference levels for each of the DPD error signal and DPP error signal were used for identifying disk types. However, the present invention is not intended to be so limited. For example, the type of an optical disk may be identified using one reference level for each of the DPD and DPP error signals.

Figure 8:
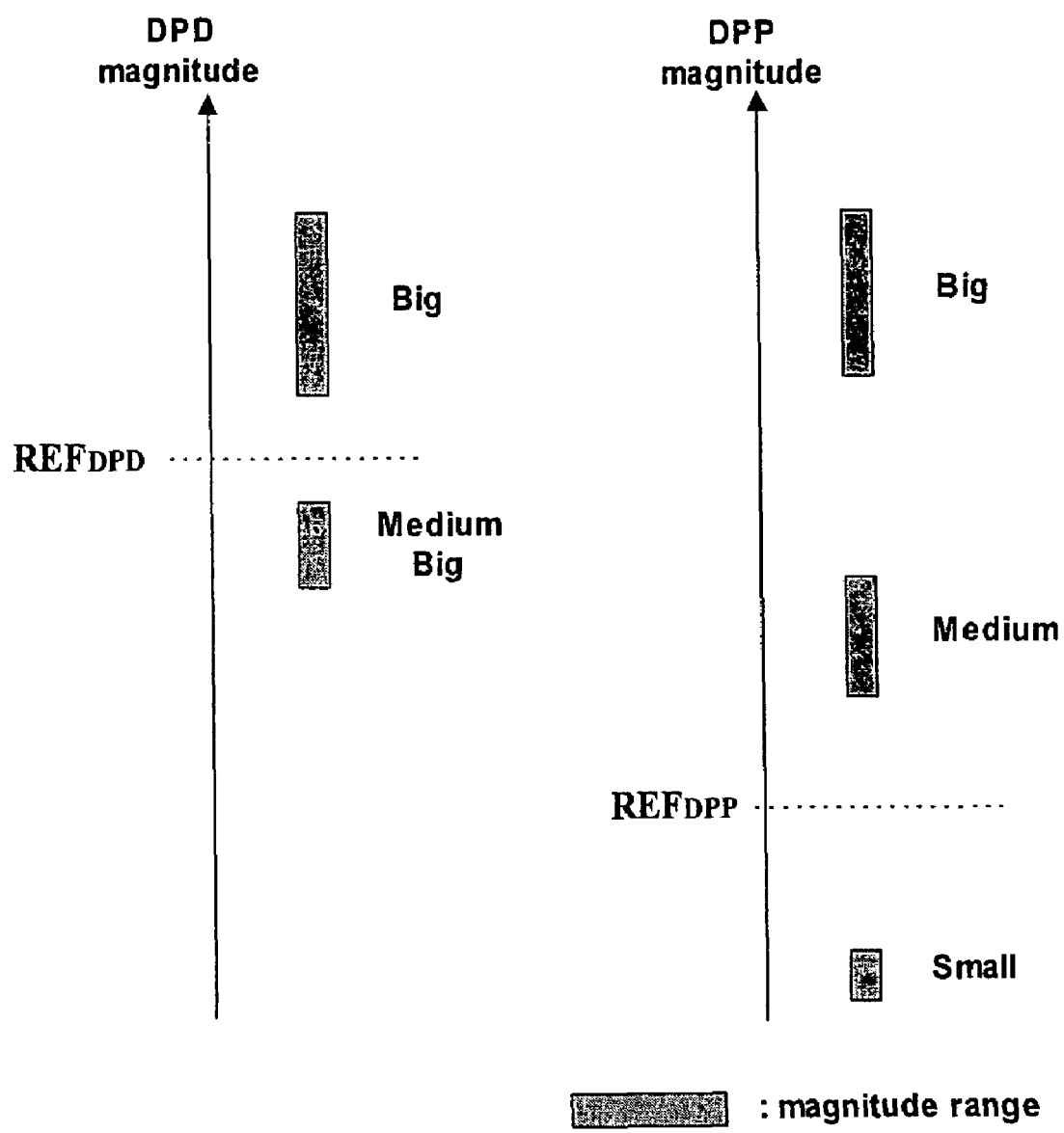
FIG. 8 illustrates a relation between reference values used in another embodiment of the present invention and tracking error signal levels.

FIG. 8 illustrates an example of a method for identifying disk types using one reference level for each tracking error signal according to another embodiment of the present invention. As shown in FIG. 8, an optical disk 10 can be concluded to be a DVD-RAM if the magnitude of the DPD error signal is greater than 'REF$_{DPD}$' and the magnitude of the DPP error signal is greater than 'REF$_{DPP}$'. The optical disk 10 can be concluded to be a DVD-ROM if the magnitude of the DPD error signal is greater than 'REF$_{DPD}$' and the magnitude of the DPP error signal is less than 'REF$_{DPP}$'. The optical disk 10 can be concluded to be DVD+/−RW if the magnitude of the DPD error signal is less than 'REF$_{DPD}$' and the magnitude of the DPP error signal is greater than 'REF$_{DPP}$'. Other conditions can be considered to be a disk identification error. For an identification error, the process can be repeated a fixed number of times and then reported to a user, host system or the like. However, the present invention is not intended to be so limited. The disk capacity of DVD-RAM and the RW type of DVD+/−RW can be determined in much the same way as described earlier.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments. Furthermore, for ease of understanding, certain method procedures may have been delineated as separate procedures; however, these separately delineated procedures should not be construed as necessarily order dependent in their performance. That is, some procedures may be able to be performed in an alternative ordering, simultaneously, etc.

As described above, embodiments of methods and apparatus for identifying disk types according to the present invention have various advantages. For example, a method of identifying optical disk types in accordance with the present invention allows correct identification of disk types using a plurality of signals (e.g., two) obtained using the disk and corresponding reference values (e.g., at least one). Thus, correct setting of servo parameters can be obtained. Thereby, servo errors and playback/recording errors caused by the servo errors can be reduced or prevented.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method of identifying a plurality of storage medium types, comprising:
    (a) creating a first signal and a second signal from light reflected from a storage medium; and
    (b) identifying a type of the storage medium based on a first comparison between the first signal and at least one reference value associated with the first signal and a second comparison between the second signal and at least one reference value associated with the second signal and different from the reference value associated with the first signal, wherein the first and second signals are tracking error signals and wherein said identifying identifies the storage medium as a DVD-RAM disk when both a magnitude of the first tracking error signal and a magnitude of the second tracking error signal are greater than their respective reference values.

2. The method of claim 1, wherein the first and second signals are different representations of the same reflected light.

3. The method of claim 1, wherein the first tracking error signal is obtained by a differential phase detection from 4-divided reflected beams, and wherein n the second tracking error signal is obtained from a difference between left-sided and right-sided of the 4-divided reflected beams and a difference between left and right side reflected beams.

4. The method of claim 1, wherein the reference values associated with each of the first and second tracking error signals have two levels being a high level and a low level.

5. The method of claim 1, further comprising:
measuring a frequency of a wobble signal resulting from a shape of tracks formed on the disk; and
determining a capacity of the disk as high capacity when the measured frequency is greater than a first threshold, and wherein the capacity is low capacity otherwise.

6. The method of claim 1, further comprising:
identifying the storage medium as a DVD-ROM disk when the magnitude of the first tracking error signal is greater than the reference value associated with the first tracking error signal and the magnitude of the second tracking error signal is less than the reference value associated with the second tracking error signal.

7. The method of claim 1, further comprising:
identifying the storage medium as a DVD+RW disk or a DVD−RW disk when the magnitude of the first tracking error signal is less than the reference value associated with the first tracking error signal and the magnitude of the second tracking error signal is greater than the reference value associated with the second tracking error signal.

8. The method of claim 7, further comprising:
measuring a frequency of a wobble signal resulting from a shape of tracks formed on the disk; and
determining whether the disk is a DVD+RW disk based on the measured frequency.

9. The method of claim 8, wherein the determining compares the measured frequency to a second threshold and the disk is determined to be a DVD+RW disk when the measured frequency is greater than the second threshold.

10. An apparatus for identifying a type of optical disk, comprising:
a processing unit configured to convert a reflected beam from a loaded optical disk into electrical signals, and generate a first signal and a second signal therefrom; and
a controller configured to identify a type of the loaded optical disk based on a first comparison between a level of the first signal and at least one reference value associated with the first signal and a second comparison between a level of the second signal and at least one reference value associated with the second signal and different from the reference value associated with the first signal, wherein the first and second signals are first and second tracking error signals created from the electrical signals in different ways, and wherein the apparatus further comprises:
a detector to detect magnitudes of the first and second tracking error signals, wherein the controller is configured to identify the optical disk as a DVD-RAM disk when both the magnitude of the first tracking error signal and the magnitude of the second tracking error signal are greater than their respective reference values.

11. The apparatus of claim 10, comprising:
a servo unit to control the processing unit;
a frequency detector to detect a frequency of a wobble signal resulting from a shape of tracks formed on the optical disk; and
a speed detector to detect a rotational speed of a motor rotating the optical disk controlled by the servo unit, wherein the controller is adapted to judge a capacity of the optical disk based on the wobble signal frequency, the rotational speed of the motor, and a current position of the processing unit when the optical disk is identified as the DVD-RAM disk.

12. The apparatus of claim 10, wherein the controller identifies the optical disk as a DVD-ROM disk when the magnitude of the first tracking error signal is greater than the reference value associated with the first tracking error signal and the magnitude of the second tracking error signal is less than the reference value associated with the second tracking error signal.

13. The apparatus of claim 10, wherein the controller identifies the optical disk as a DVD+RW disk or a DVD−RW disk when the magnitude of the first tracking error signal is less than the reference value associated with the first tracking error signal and the magnitude of the second tracking error signal is greater than the reference value associated with the second tracking error signal.

14. The apparatus of claim 13, further comprising:
a frequency detector to detect a frequency of a wobble signal resulting from a shape of tracks formed on the optical disk; and
a speed detector to detect a rotational speed of the optical disk,
wherein the controller is adapted to judge whether the optical disk is the DVD−RW disk based on the wobble signal frequency, the rotational speed of the optical disk, and a current position of the processing unit.

* * * * *